(12) United States Patent
Chapman

(10) Patent No.: US 10,462,326 B2
(45) Date of Patent: Oct. 29, 2019

(54) MACHINE READABLE SECURITY MARK AND PROCESS FOR GENERATING SAME

(71) Applicant: Xerox Corporation, Norwalk, CT (US)

(72) Inventor: Edward N. Chapman, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/937,948

(22) Filed: Mar. 28, 2018

(65) Prior Publication Data

US 2019/0306367 A1    Oct. 3, 2019

(51) Int. Cl.
| | |
|---|---|
| *G06K 15/00* | (2006.01) |
| *H04N 1/40* | (2006.01) |
| *H04N 1/32* | (2006.01) |
| *H04N 1/00* | (2006.01) |
| *G06F 3/12* | (2006.01) |

(52) U.S. Cl.
CPC ....... *H04N 1/32267* (2013.01); *G06F 3/1222* (2013.01); *G06F 3/1243* (2013.01); *H04N 1/00331* (2013.01); *H04N 1/32352* (2013.01)

(58) Field of Classification Search
CPC .......... H04N 1/32267; H04N 1/00331; H04N 1/32352
USPC ............................... 358/3.28, 1.15, 1.14, 1.1
See application file for complete search history.

(56) References Cited

U.S. PATENT DOCUMENTS

| | | | |
|---|---|---|---|
| 7,522,075 B2* | 4/2009 | Mak | B64F 1/368 |
| | | | 341/90 |
| 8,310,718 B2 | 11/2012 | Chapman et al. | |
| 9,137,405 B2 | 9/2015 | Eschbach et al. | |
| 9,282,215 B2 | 3/2016 | Chapman et al. | |
| 9,471,846 B2 | 10/2016 | Fan et al. | |
| 9,589,217 B2 | 3/2017 | Eschbach et al. | |
| 9,736,330 B2 | 8/2017 | Eschbach et al. | |
| 9,864,906 B2 | 1/2018 | Eschbach et al. | |
| 9,864,920 B2 | 1/2018 | Eschbach et al. | |
| 2004/0225773 A1 | 11/2004 | Wang et al. | |
| 2016/0127603 A1 | 5/2016 | Chapman et al. | |
| 2017/0228620 A1 | 8/2017 | Chapman et al. | |
| 2018/0012099 A1* | 1/2018 | Vanhall | G06K 9/344 |
| 2018/0350144 A1* | 12/2018 | Rathod | H04W 4/029 |

* cited by examiner

*Primary Examiner* — Douglas Q Tran
(74) *Attorney, Agent, or Firm* — Fox Rothschild LLP

(57) ABSTRACT

A print device prints a document with a security marking in a microtext font. A scanning device scans the security marking, and an optical character recognition (OCR) engine attempts to recognize the characters in the security marking. The system the generates an encoding in which each character of the font is mapped to a character string made up only of characters that the OCR engine could recognize at or above a minimum recognition threshold. Then, when generating a new document with a new security marking in the microtext font, the system will use the encoding to replace each character in the security marking with its representation from the encoding so that the scanner and OCR engine can decode the security marking.

23 Claims, 5 Drawing Sheets

MACHINE READABLE SECURITY MARK AND PROCESS FOR GENERATING SAME

BACKGROUND

Security is an important requirement in many document printing applications. In situations such as official or government document printing, event ticket printing, financial instrument printing and the like, many printed documents must be protected against copying, forging and/or counterfeiting.

In some situations, document creators may wish to encode a security mark in a document in a way that is invisible to the human eye, but which can be detected by optical character recognition (OCR) systems. However, existing methods of encoding security marks onto printed documents exhibit various technical limitations. Invisible inks can be used, but they are expensive to apply and can degrade over time. In addition, the technical capabilities of various OCR systems can vary, so not all printed security marks can be read by various OCR systems.

This document describes methods and systems for creating and using a document with a security mark that addresses at least some of the problems described above, and/or other problems.

SUMMARY

In various aspects, in a method of generating an encoding for printing secure information on a document, a print device prints on a security mark on a substrate. The security mark includes various characters in a microtext font. Each of the characters appears more than one time in the security mark. A scanning device scans the security mark to create a digital image. An image processing server implements an optical character recognition (OCR) engine by: (i) applying an OCR process to the digital image to attempt to recognize the characters in the security mark; (ii) identifying which of the characters in the security mark are recognized via the OCR process at least a number of times that exceeds a recognition threshold, and (iii) allocating the characters that are recognized via the OCR process at least a threshold number of times to a character subset for an encoding. A processing device, which may be an element of the image processing server, the print device, the scan device, or a different device, executes programming instructions to generate an encoding by: (i) determining how many characters are in the character subset; (ii) determining how many font characters are required to print the microtext font; (iii) generating an encoding comprising a representation of each of the font characters by an encoded character string that consists of one or more of the characters that are in the character subset; and (iv) saving the encoding to a memory device.

Optionally, the image processing server may scale the digital image up to a resolution of the OCR engine before applying the OCR process to the digital image.

After the encoding is generated, then upon receipt of a command to print a new microtext security mark on a new document, a processor in the system may identify each character that is to be printed in the new microtext security mark. For each identified character that is to be printed, the processor may map the identified character to an encoded character string in the encoding that represents the identified character. A print device, which may be the device that printed the original document or a different print device, will print the new document with each identified character in the new microtext security mark replaced by its encoded character string.

Optionally, the scanning device may scan a new microtext security mark that is printed on a new document. The image processing server may receive an indication that the new microtext security mark corresponds to the encoding, and it may use the OCR engine to identify the encoded character strings from the encoding that are in the new microtext security mark. The image processing server will also access the encoding and convert each of the identified encoded character strings in the new microtext security mark to a corresponding font character as represented in the encoding. The image processing server will save, to a memory, a document file in which the identified encoded character strings in the new microtext security mark are replaced with their corresponding font characters. In addition, a print device may print, or a display device may display, a document comprising the new microtext security mark with corresponding font characters that were identified in the converting step.

Optionally, the font may include a 256-character ASCII font. Each of the encoded character strings may include a string of 4 characters, a string of 8 characters, a string of 16 characters, or a different number of characters.

Optionally, the recognition threshold may include a percentage that has a value of at least 50%. Optionally, the recognition threshold may include a requirement that a character be recognized at a level that is greater than that of other characters.

In another aspect, a system includes an image processing server. The system also includes a computer-readable medium containing programming instructions that are configured to cause the image processing server, by itself and/or with other system elements such as a print device and scanning device, to implement methods such as those described above.

In another aspect, a computer-readable medium contains programming instructions that are configured to cause a processing device, by itself and/or with other system elements such as a print device and scanning device, to implement methods such as those described above.

In another aspect, a system or non-transitory computer-readable medium may contain programming instructions to use an encoding to decode secure information that is printed on a document. The instructions may be configured to cause an image processing server to receive, from a scanning device, a digital scanned image of a security mark that is printed on a substrate comprising a plurality of characters in a microtext font. Each of the characters printed in the security mark may be part of an encoded character string that represents a full character set of the microtext font. Each of characters included in the security mark may be part of a character subset that was extracted from the full character set. The system may receive an indication that the new microtext security mark corresponds to the encoding. The system may apply an OCR process to identify the encoded character strings that are in the microtext security mark> The system may access a memory device containing the encoding, and it may map each of the identified encoded character strings in the microtext security mark to a corresponding font character of the full character set as represented in the encoding. The system may then convert each of the identified encoded character strings in the microtext security mark to its corresponding font character of the full character set, and it may save a document file in which the identified encoded character strings in the microtext security mark have been replaced with their corresponding font characters from the full character set.

Optionally, in this aspect the system also may cause a print device to print a document comprising the microtext security mark with corresponding font characters of the full character set that were identified in the converting step.

DETAILED DESCRIPTION

Figure 1:
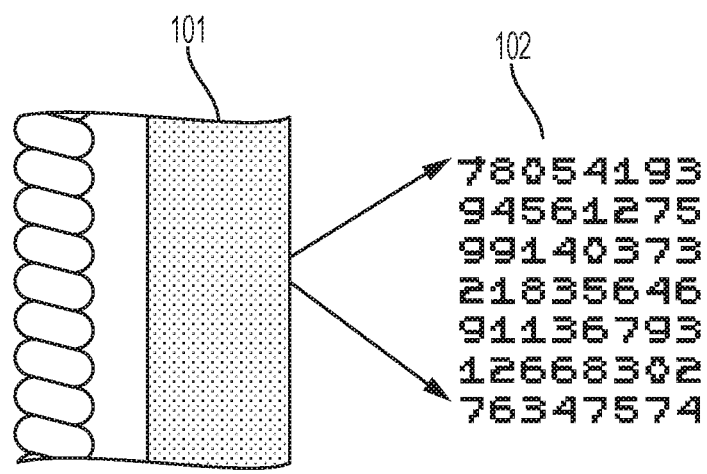
FIG. 1 illustrates an example of a printed image into which microtext has been encoded to provide a security mark.

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used in this document, the term "comprising" means "including, but not limited to."

In this disclosure, the term "document" refers to a print media onto which content has been printed. The content may be printed on the print media substrate using toner and/or ink. The document may, for example, include one or more areas comprising characters, and/or one or more other areas consisting of images.

The term "electronic device" refers to a device having a processor and a non-transitory, computer-readable medium (i.e., memory). The memory may contain programming instructions in the form of a software application that, when executed by the processor, causes the device to perform one or more processing operations according to the programming instructions. An electronic device also may include additional components such as a touch-sensitive display device that serves as a user interface, as well as a camera or other image capturing device. An electronic device also may include one or more communication hardware components such as a transmitter and/or receiver that will enable the device to send and/or receive signals to and/or from other devices, whether via a communications network or via near-field or short-range communication protocols.

In this document the term "encoding" refers to a set of rules to represent characters of a particular font as microtext using a limited set of characters.

The terms "memory," "memory device," "computer-readable medium" and "data store" each refer to a non-transitory device on which computer-readable data, programming instructions or both are stored. Unless the context specifically states that a single device is required or that multiple devices are required, the terms "memory," "memory device" "computer-readable medium" and "data store" include both the singular and plural embodiments, as well as portions of such devices such as memory sectors.

The term "microtext" refers to a printed character set of a size that is so small that the individual characters are not typically discernable by the human eye. Microtext will have a maximum size threshold such as 1 point, ¹⁄₁₀₀th of an inch or the like. An example is 0.84 point font. Additional fonts ranging from 0.72 point font to 1.08 point font may be considered microtext, along with similarly small sizes. As another example, microtext may have a size corresponding to a maximum of 600 line pairs per degree. Systems that use non-English characters, such as Chinese, Japanese, Hebrew or Arabic, may have larger minimum sizes.

A "print device" or "print engine" is a device that is configured to print a document based on digital data, or a multi-functional device in which one of the functions is printing based on digital data. Example components of a print device include a print head, which may include components such as a print cartridge containing ink, toner or another print material, as well as a document feeding system configured to pass a substrate through the print device so that the print head can print characters and/or images on the substrate.

A "processor" or "processing device" is a hardware component of an electronic device that is configured to execute programming instructions. The term "processor" may refer to either a single processor or to multiple processors that together implement various steps of a process. Unless the context specifically states that a single processor is required or that multiple processors are required, the term "processor" includes both the singular and plural embodiments.

Microtext may be used in security printing to mitigate against copying, forging and counterfeiting of documents, because most typical scanning and copying devices do not operate at a resolution that is sufficient to copy all characters of the microtext. FIG. 1 shows this by way of example. In FIG. 1, an image 101 is printed, and in the image certain content is printed using microtext. The individual characters of the microtext cannot be seen without magnification and thus appear as solid lines in the image 101. However, when a segment 102 of the image is magnified, one can see that the solid lines are actually made up of individual characters that can make up a sequence such as words.

If the image 101 were not the original but rather were a photocopy or a scanned version of the document created with a typical, commonly-used copying or scanning device, then when the segment 102 is magnified some or all of the individual characters would not be discernable. Instead, some or all of the microtext characters would be blurry and/or altered, and some or all portions of the solid line may remain solid even under magnification.

Figure 2:
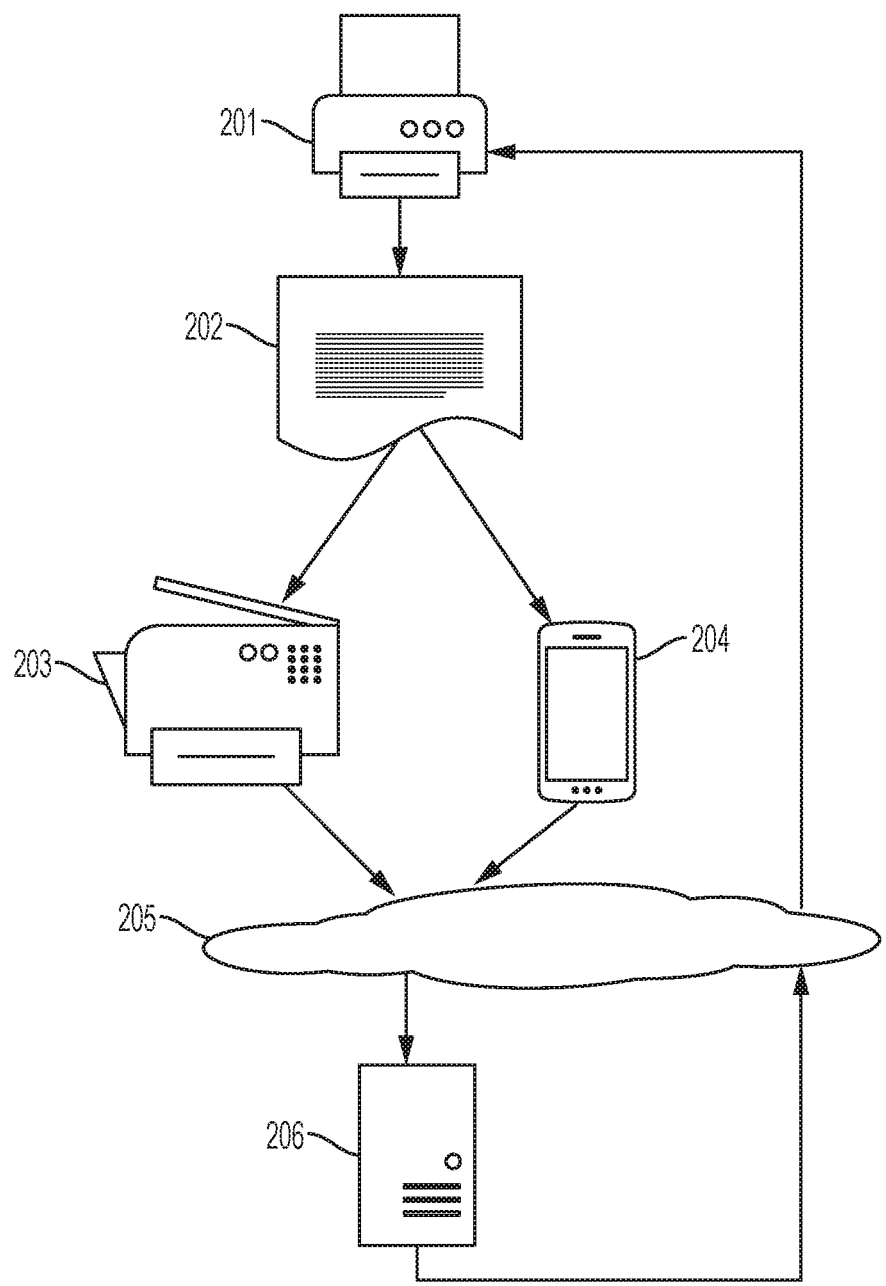
FIG. 2 illustrates a system for generating and decoding documents containing microtext security marks.

FIG. 2 illustrates a system that may be used to generate a secure printed document. In FIG. 2, a print device 201 receives a command to print a document 202 that contains a security mark that includes microtext. The printed document 202 may include graphics and/or characters, and the microtext will form one or more portions of one or more lines of the image, such as is shown by way of example in FIG. 1. The print device 201 may receive this command from a communicatively connected computing device or memory storage device. Alternatively, the print device may receive this command from a remote electronic device that is in wireless and/or wired communication with the print device 201 via one or more communication networks 205.

The print device 201 will print a document 202 that includes the image on a substrate. A scanning device will then scan the image to create a digital image that is a data file with data representing the image in digital format. The scanning device may be a multifunction device 203 that includes a scanner, a stand-alone scanner, an electronic device 204 that includes a camera, or any other device that includes an image sensor and a processor that executes programming instructions that cause the image sensor to digitally capture an image of the document. The scanning device (203 or 204) may be a component of the same device or system that includes the print device 201 that printed the document, or it may be a separate scanning device.

Once the scanning device 203/204 has captured the digital image, an image processing server 206 will perform certain actions to process the digital image, as will be described below in more detail in the context of FIG. 3. The image processing server 206 will include a processing device and a memory device on which image processing programming instructions are stored. The image processing server 206 may include a single device or a collection of distributed devices. One or more components of the image processing server 206 may be part of the scanning device 203/204, and/or one or more components of the image processing server 206 may be communicatively connected to the scanning device 203/204 via one or more communications networks 205.

The image processing server 206 will generate an encoding that can then be used to print additional secure printed documents. The characters included in the encoding will be limited to those that the scanning device was able to recognize at least a threshold number of times, as will be described in more detail below. The encoding will therefore be a device-relevant encoding because it helps to ensure that microtext printed in future documents will be discernable by the image sensor and image processing instructions implemented by the applicable scanning device 203/204. The image processing server 206 will provide this encoding to the print device 201, to a different print device, or to another electronic device that generates document printing instructions so that the microtext in future printed documents will be discernable by the image sensor and image processing instructions implemented by the applicable scanning device 203/204.

Figure 3:
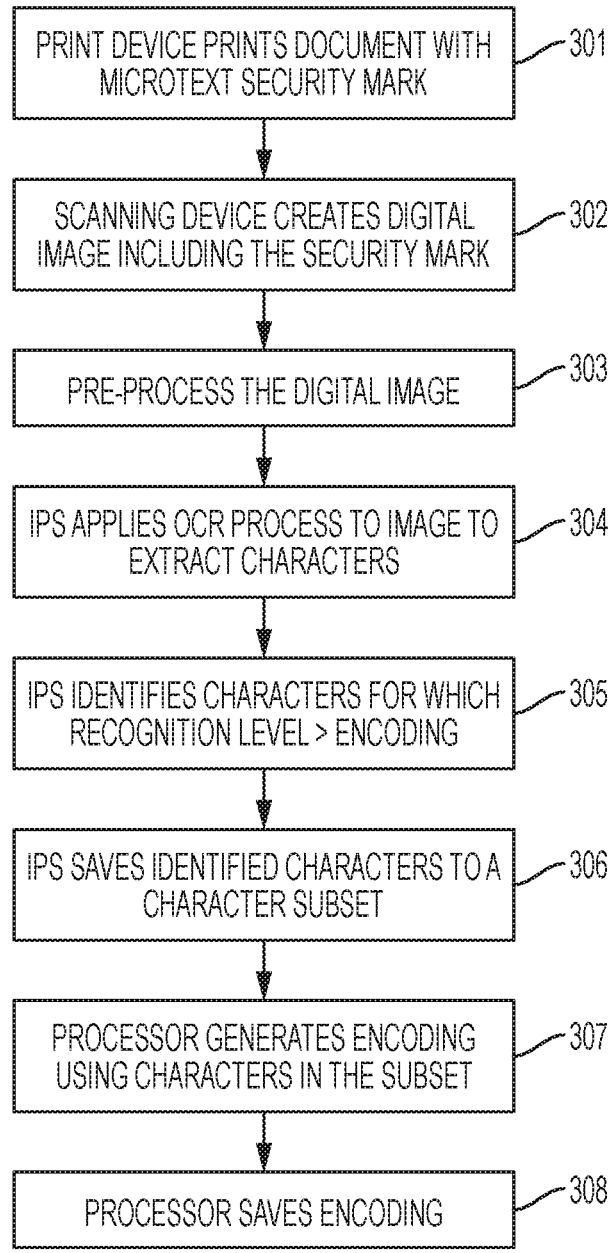
FIG. 3 is a flowchart that illustrates a process that can be used to generate an encoding for use in creating documents containing microtext security marks.

FIG. 3 provides additional detail about the process that a system such as that of FIG. 2 may implement. As noted above, a print device will receive a command. In response to the command, the print device will print a document with an image (graphics and/or characters) that contains a security mark that includes microtext (step 301). The microtext will be a set of characters, and each of the characters will be printed more than one time in the security mark. The characters will correspond to a particular font, such as for example a 256-character ASCII font. The print device may receive this command from a communicatively connected local or remote computing device or memory storage device. To the extent that space on the document allows, each microtext character may be printed on the document at least 10 times, at least 20 times, at least 50 times, at least 100 times, or any number of times so that the characters will appear more than a nominal number of times in the document.

A scanning device will then scan the document (or at least a portion of the image in the document that contains the security mark) to create a digital image that is a data file with data representing the image in digital format (step 302). Once the scanning device has captured the digital image, the image processing server (abbreviated as IPS in FIG. 3) will perform certain actions to process the digital image, including implementing an optical character recognition (OCR) engine to attempt to extract (i.e., recognize and identify) the microtext characters in the digital image (step 304). The OCR engine will include programming instructions that are configured to cause the image processing server to perform any suitable now or hereafter known OCR process.

Optionally, to help improve accuracy of the OCR engine, before attempting to recognize the microtext characters the scanning device and/or the image processing server may pre-process the digital image (step 303). For example, the system may scale up the digital image so that the individual microtext characters are of a size that is least as large as the rated recognition capability (i.e., a selected resolution) of the OCR engine. For example, if the OCR engine is typically capable of recognizing characters that are of a size corresponding to a 10-point font and the microtext consists of a 1-point font, the system may upscale the digital image by 10$x$ or higher. Other pre-processing steps may include de-skewing, de-speckling and/or (if the image is not black-and-white) binarization. Other pre-processing steps may be used.

After the system attempts to recognize the microtext characters in the digital image (step 304), the image processing server will identify which of the characters were recognized at least a threshold number of times (step 305). The threshold may be any suitable threshold indicating that a system using the same scanning device and OCR instructions will likely to be able to recognize those characters again in future secure printed documents. Possible threshold values may include, for example, 98%, 95%, 90%, 80%, 75% any value that is greater than 50%, or another suitable value. Other thresholds may be a value that is the highest of all values in the set of recognized characters, or it may be a requirement that the value be the highest value and at least a set percentage higher than the next greatest value or more than the character is mis-recognized. Other thresholds may be used. Thus, the threshold may be a numeric threshold, a criterion, or a combination of the two.

When determining which characters have a recognition level that is at or above the threshold, the system may consider a character to be an individual character (such as A, B, C, 1, 2, 3, and the like). Alternatively, the system may use optical word recognition to recognize particular strings of individual characters that make up one or more words, a hexadecimal number, or another particular character sequence.

Once the system identifies which characters have a recognition level that is at or above the threshold (step 305), the system will allocate those characters to a character subset (step 306) that will be used to generate an encoding which as noted above is a set of rules to represent characters of the particular font that is used in the microtext as sets of character strings using a limited set of characters. The character strings may be, for example, strings of 4 characters each, 8 characters each, 16 characters each, or any other number of characters.

A processing device will then use the characters of the subset to generate the encoding 307 by determining how many characters are in the character subset, determining how many characters font characters are required to print a particular font, and generate the encoding as a representation of each of the font characters by an encoded character string that consists only of characters that are in the character subset. The processing device that generates the encoding may be a component of the image processing server or it may be a separate processing device. The processing device will then save the encoding to a memory device (step 308) so that the encoding may be used to generate future documents that will be scanned and processed by the scanning device and OCR engine.

An example result of the OCR engine is shown in the two lines reproduced below:
N H-N M N H H N H N N N N M N M M M N M N N N
H M M N N N H M M H M N N~N p p p p p p p p p p p p
p p p p p p p p p p p p p p p p p p p p p p p p p p p p
p p p p p p p p p p p In these two lines, the first line of the scanned document was a row of microtext in which each character was an "N." The second line of the scanned document was a row of microtext in which each character was a "p". The result above shows that the OCR engine mis-identified several of the characters in the first line as "M" or "H" (or didn't identify the character at all) more often that it correctly identified the characters as "N". The result shows that the OCR engine correctly identified the character "P" each time in the second line, even though some of the characters may have been identified in italic or bold format. Thus, the encoding for this font will not use the letter N but instead will represent the letter N with a string of one or more characters that are recognizable by the OCR engine, such as a string that includes p's and other recognizable characters. The encoding may represent the letter p as itself, or by another recognizable character string according to a schema of the encoding. By way of example, if the encoding uses a schema in which: (i) each character string includes 4 characters; (ii) the letters p and L are recognizable characters, and (iii) the letter N is not a recognizable character, then the encoding may represent the letter p as pppp and the letter N as pLpL.

Figure 4:
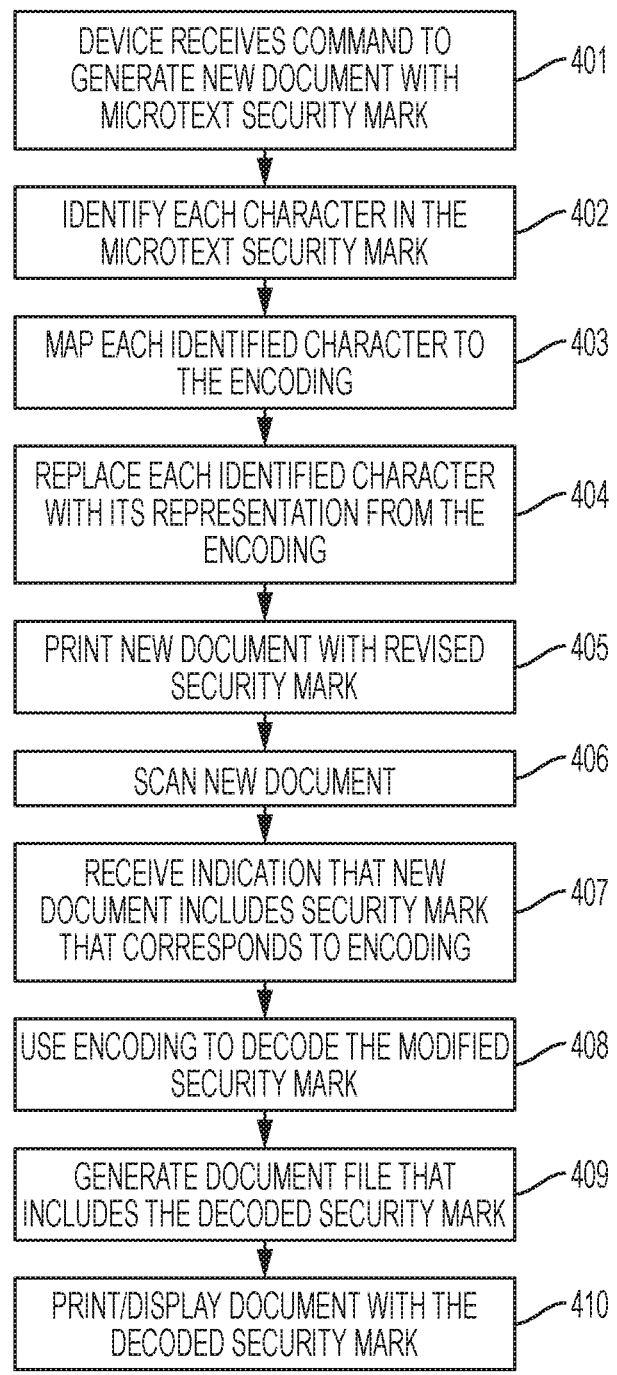
FIG. 4 is a flowchart that illustrates a process of using an encoding to generate a new document containing a new microtext security mark, as well as decoding the microtext security mark.

Referring to FIG. 4, after the encoding is saved, the print device, or a different computing device that has access to the encoding, may receive a command to generate a new document with a microtext security mark (step 401). The command may be a document file and/or a rule set. The command may include instructions to print the microtext in the specified font for recognition by the scanning device and OICR engine, or the print device may implement those instructions as received from a separate device or as retrieved from internal storage.

The system will then use the encoding to generate the new document. To generate the new document, the system may identify each character that is to be printed in the new microtext security mark (step 402). For each identified character that is to be printed, the system may map the identified character to the encoded character string that represents the identified character in the encoding (step 403). The system may revise the instructions to modify the microtext security mark so that each character in the microtext security mark is replaced by its corresponding encoded character string from the encoding (step 404). A print device will then print the new document with the modified microtext security mark in which each character in the set of text of the original microtext security mark is replaced by its corresponding encoded character string from the encoding (step 405).

After the new document is printed, the scanning device and image processing engine may decode the microtext security mark. To do this, then scanning device will scan the document, or at least a portion of it that contains the modified microtext security mark (step 406). The system may receive an indication that the modified microtext security mark includes a group of encoded character strings from the encoding (step 407). The system may receive this indication by a command or parameter setting that is provided with the document. Or, the scanner or OCR engine may recognize this, such as by recognizing a known symbol printed on the document, or by recognizing the modified microtext security mark itself. When this happens, the system may apply use the encoding to decode the modified microtext security mark (step 408). To do this, the system may apply the OCR engine to the modified microtext security mark to identify the encoded character strings in the modified microtext security mark, and the system may map the encoded character strings to their corresponding font characters of the full font character set by accessing the encoding and converting each of the encoded character strings to its corresponding font character as represented in the encoding. The system may save, to a memory, a new document file in which the character strings in the modified microtext security mark are replaced with their corresponding font characters from the full character set as represented in the encoding (step 409). The system may then use the new document file to cause a print device to print, or a display device to display a new document with the decoded microtext security mark (step 410).

Figure 5:
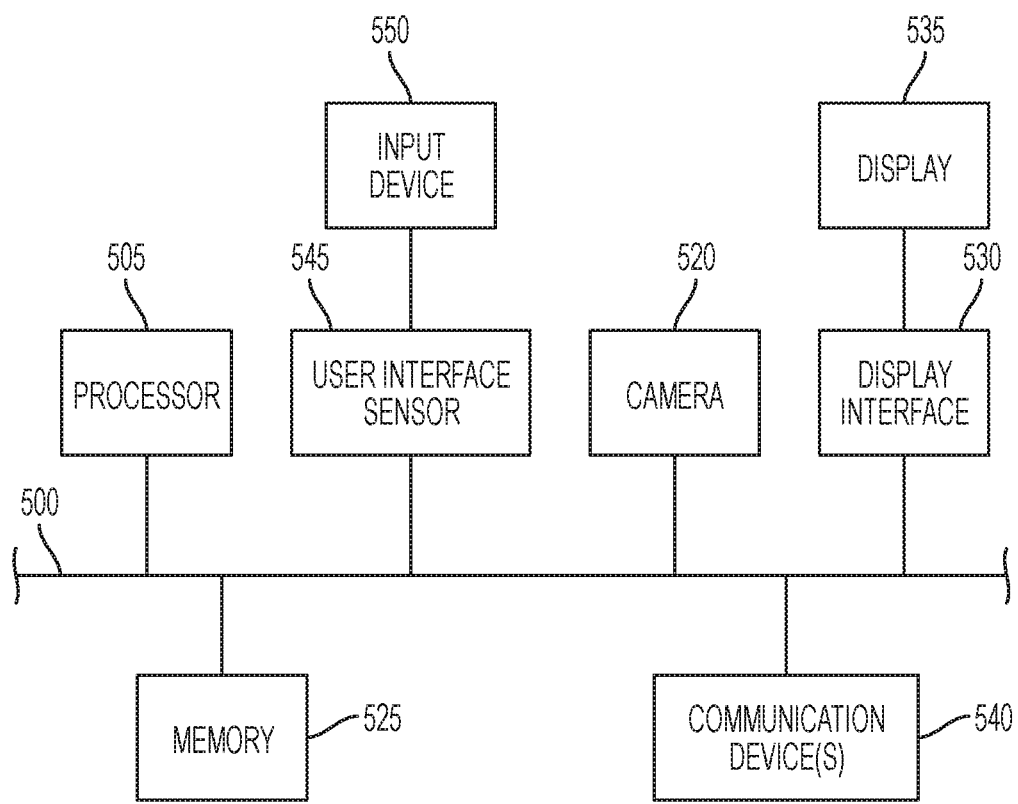
FIG. 5 is a block diagram showing various equipment that may be used to implement various embodiments of the processes described in this document.

FIG. 5 depicts an example of internal hardware that may be included in any of the electronic components of the system, such as the user's smartphone or a local or remote computing device in the system. An electrical bus 500 serves as an information highway interconnecting the other illustrated components of the hardware. Processor 505 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 525. A memory device may include a single device or a collection of devices across which data and/or instructions are stored. Various embodiments of the invention may include a computer-readable medium containing programming instructions that are configured to cause one or more processors, print devices and/or scanning devices to perform the functions described in the context of the previous figures.

An optional display interface 530 may permit information from the bus 500 to be displayed on a display device 535 in visual, graphic or alphanumeric format. An audio interface and audio output (such as a speaker) also may be provided. Communication with external devices may occur using various communication devices 540 such as a wireless antenna, an RFID tag and/or short-range or near-field communication transceiver, each of which may optionally communicatively connect with other components of the device via one or more communication system. The communication device(s) 540 may be configured to be communicatively connected to a communications network, such as the Internet, a local area network or a cellular telephone data network.

The hardware may also include a user interface sensor 545 that allows for receipt of data from input devices 550 such as a keyboard, a mouse, a joystick, a touchscreen, a touch pad, a remote control, a pointing device and/or microphone. Digital image frames also may be received from a camera 520 that can capture video and/or still images.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of generating an encoding for printing secure information on a document, the method comprising:
   by a print device, printing on a substrate a security mark comprising a plurality of characters in a microtext font, wherein each of the plurality of characters appears more than one time in the security mark;
   by a scanning device, scanning the security mark to create a digital image that includes the security mark;
   by an image processing server, executing programming instructions to implement an optical character recognition (OCR) engine by:
      receiving the digital image that was created by the scanning device and that includes the security mark,
      applying an OCR process to the digital image to attempt to recognize the plurality of characters in the security mark,
      identifying which of the plurality of characters in the security mark are recognized via the OCR process at least a number of times that exceeds a recognition threshold,
      saving the plurality of characters that are recognized via the OCR process at least a threshold number of times as a character subset for an encoding; and
   by a processing device, executing programming instructions to generate an encoding by:
      determining how many characters are in the character subset,
      determining how many font characters are required to print the microtext font,
      generating an encoding comprising a representation of each of the font characters by an encoded character string that consists of one or more of the characters that are in the character subset, and
      saving the encoding to a memory device.

2. The method of claim 1 further comprising, by the image processing server, scaling the digital image up to a resolution of the OCR engine before applying the OCR process to the digital image.

3. The method of claim 1, further comprising, by a processor:
   receiving a command to print a new microtext security mark on a new document,
   identifying each character that is to be printed in the new microtext security mark;
   for each identified character that is to be printed, mapping the identified character to an encoded character string in the encoding that represents the identified character; and
   causing a print device to print the new document with identified character in the new microtext security mark replaced by its encoded character string.

4. The method of claim 1, further comprising, by the image processing server:
   causing the scanning device to scan a new microtext security mark that is printed on a new document;
   receiving an indication that the new microtext security mark corresponds to the encoding;
   using the OCR engine to identify the encoded character strings from the encoding that are in the new microtext security mark;
   accessing the encoding, and converting each of the identified encoded character strings in the new microtext security mark to a corresponding font character as represented in the encoding; and
   saving, to a memory, a document file in which the identified encoded character strings in the new microtext security mark are replaced with their corresponding font characters.

5. The method of claim 4 further comprising, by a print device or a display device, printing or displaying a document comprising the new microtext security mark with corresponding font characters that were identified in the converting step.

6. The method of claim 1, wherein:
   the font comprises a 256-character ASCII font; and
   each of the encoded character strings comprises a string of 4 characters, a string of 8 characters, or a string of 16 characters.

7. The method of claim 1, wherein the recognition threshold comprises:
   a percentage that has a value of at least 50%; or
   a requirement that a character be recognized at a level that is greater than that of other characters.

8. A system for generating an encoding for printing secure information on a document, the system comprising:
   an image processing server comprising a processing device and a non-transitory computer-readable medium containing programming instructions that are configured to cause the image processing server to:
      receive, from a scanning device, a digital scanned image of a security mark that is printed on a substrate comprising a plurality of characters in a microtext font, wherein:
         each of the plurality characters appears more than one time in the security mark, and
         the microtext font comprises a plurality of font characters,
      apply an OCR process to the digital scanned image to attempt to recognize the plurality of characters in the security mark;
      identify which of the plurality of characters in the security mark are recognized via the OCR process at least a number of times that exceeds a recognition threshold;
      allocate the plurality of characters that are recognized via the OCR process at least a threshold number of times to a character subset for an encoding;
      generate an encoding comprising a representation of each of the font characters in the microtext font as an encoded character string that consists of one or more of the characters that are in the character subset; and
      save the encoding to a memory device.

9. The system of claim 8, further comprising additional programming instructions that are configured to cause the image processing server to scale the digital scanned image up to a resolution of an OCR engine that implements the OCR process before applying the OCR process to the digital scanned image.

10. The method of claim 8, further comprising:
a print device; and
additional programming instructions that are configured to cause a processor to:
receive a command to print a new microtext security mark on a new document,
identify each character that is to be printed in the new microtext security mark,
for each identified character that is to be printed in the new microtext security mark, map the identified character to an encoded character string in the encoding that represents the identified character, and
cause the print device to print the new document with identified character in the new microtext security mark replaced by its encoded character string.

11. The system of claim 8, further comprising:
the scanning device; and
additional programming instructions that are configured to cause the scanning device to create the digital scanned image of the security mark by scanning at least a portion of the substrate that contains the plurality of characters in the microtext font.

12. The system of claim 8, further comprising additional programming instructions that are configured to cause the image processing server to:
receive a new digital scanned image from the scanning device, wherein the new digital scanned image comprises a new microtext security mark that is printed on a new document;
receive an indication that the new microtext security mark corresponds to the encoding;
apply the OCR process to identify the encoded character strings from the encoding that are in the new microtext security mark;
access the encoding, and convert each of the identified encoded character strings in the new microtext security mark to a corresponding font character as represented in the encoding; and
save, to a memory, a document file in which the identified encoded character strings in the new microtext security mark are replaced with their corresponding font characters.

13. The system of claim 12, further comprising:
a print device; and
programming instructions that are configured to cause the image processing server to instruct the print device to print a document comprising the new microtext security mark with corresponding font characters that were identified in the converting step.

14. A non-transitory computer-readable medium containing programming instructions that are configured to generate an encoding for printing secure information on a document, the programming instructions comprising instructions that are configured to cause an image processing server to:
receive, from a scanning device, a digital scanned image of a security mark that is printed on a substrate comprising a plurality of characters in a microtext font, wherein:
each of the plurality characters appears more than one time in the security mark, and
the microtext font comprises a plurality of font characters;
apply an OCR process to the digital scanned image to attempt to recognize the plurality of characters in the security mark;
identify which of the plurality of characters in the security mark are recognized via the OCR process at least a number of times that exceeds a recognition threshold;
allocate the plurality of characters that are recognized via the OCR process at least a threshold number of times to a character subset for an encoding;
generate an encoding comprising a representation of each of the font characters in the microtext font as an encoded character string that consists of one or more of the characters that are in the character subset; and
save the encoding to a memory device.

15. The computer-readable medium of claim 14, further comprising additional programming instructions that are configured to cause the image processing server to scale the digital scanned image up to a resolution of an OCR engine that implements the OCR process before applying the OCR process to the digital image.

16. The computer-readable medium of claim 14, further comprising additional programming instructions that are configured to cause a processor to:
receive a command to print a new microtext security mark on a new document;
identify each character that is to be printed in the new microtext security mark;
for each identified character that is to be printed, map the identified character to an encoded character string in the encoding that represents the identified character; and
cause a print device to print the new document with identified character in the new microtext security mark replaced by its encoded character string.

17. The computer-readable medium of claim 14, further comprising additional programming instructions that are configured to cause the scanning device to create the digital scanned image of the security mark by scanning at least a portion of the substrate that contains the plurality of characters in the microtext font.

18. The computer-readable medium of claim 14, further comprising additional programming instructions that are configured to cause the image processing server to:
receive a new digital scanned image from the scanning device, wherein the new digital scanned image comprises a new microtext security mark that is printed on a new document;
receive an indication that the new microtext security mark corresponds to the encoding;
apply the OCR process to identify the encoded character strings from the encoding that are in the new microtext security mark;
access the encoding, and convert each of the identified encoded character strings in the new microtext security mark to a corresponding font character as represented in the encoding; and
save, to a memory, a document file in which the identified encoded character strings in the new microtext security mark are replaced with their corresponding font characters.

19. The computer-readable medium of claim 18, further comprising additional programming instructions that are configured to cause a print device to print a document comprising the new microtext security mark with corresponding font characters that were identified in the converting step.

20. The computer-readable medium of claim 14, wherein:
the font comprises a 256-character ASCII font; and
each of the encoded character strings comprises a string of 4 characters, a string of 8 characters, or a string of 16 characters.

21. The computer-readable medium of claim 14, wherein the recognition threshold comprises:
a percentage that has a value of at least 50%; or
a requirement that a character be recognized at a level that is greater than that of other characters.

22. A non-transitory computer-readable medium containing programming instructions that are configured to use an encoding to decode secure information that is printed on a document, the programming instructions comprising instructions that are configured to cause an image processing server to:
receive, from a scanning device, a digital scanned image of a security mark that is printed on a substrate comprising a plurality of characters in a microtext font, wherein each of the characters printed in the security mark is part of an encoded character string that represents a full character set of the microtext font, and wherein the plurality of characters included in the security mark are a character subset of the full character set;
receive an indication that the new microtext security mark corresponds to an encoding;
apply an OCR process to identify the encoded character strings that are in the new microtext security mark;
access a memory device containing the encoding, and map each of the identified encoded character strings in the microtext security mark to a corresponding font character in the full character set as represented in the encoding;
convert each of the identified encoded character strings in the microtext security mark to its corresponding font character in the full character set; and
save, to a memory, a document file in which the identified encoded character strings in the microtext security mark have been replaced with their corresponding font characters in the full character set.

23. The computer-readable medium of claim 22, further comprising additional programming instructions that are configured to cause a print device to print a document comprising the microtext security mark with corresponding font characters of the full character set that were identified in the converting step.

* * * * *